(12) United States Patent
Burd et al.

(10) Patent No.: US 11,838,448 B2
(45) Date of Patent: Dec. 5, 2023

(54) AUDIO-BASED POLLING DURING A CONFERENCE CALL DISCUSSION

(71) Applicant: Google LLC, Mountain View, CA (US)

(72) Inventors: Emily Burd, New York, NY (US); Akshat Sharma, Cambridge, MA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 17/538,599

(22) Filed: Nov. 30, 2021

(65) Prior Publication Data

US 2023/0068231 A1  Mar. 2, 2023

Related U.S. Application Data

(60) Provisional application No. 63/237,370, filed on Aug. 26, 2021.

(51) Int. Cl.
| | |
|---|---|
| *H04M 3/56* | (2006.01) |
| *G10L 15/22* | (2006.01) |
| *G06F 40/289* | (2020.01) |
| *G10L 15/26* | (2006.01) |

(52) U.S. Cl.
CPC .......... *H04M 3/563* (2013.01); *G06F 40/289* (2020.01); *G10L 15/22* (2013.01); *G10L 15/26* (2013.01); *H04M 3/568* (2013.01)

(58) Field of Classification Search
None
See application file for complete search history.

(56) References Cited

U.S. PATENT DOCUMENTS

| | | |
|---|---|---|
| 6,581,071 B1 | 6/2003 | Gustman et al. |
| 10,176,808 B1 | 1/2019 | Lovitt et al. |
| 10,424,297 B1 | 9/2019 | Carino |
| 10,452,652 B2 | 10/2019 | Sanchez et al. |
| 11,250,857 B1 | 2/2022 | Kim et al. |
| 11,314,761 B1 | 4/2022 | Yestrau et al. |

(Continued)

FOREIGN PATENT DOCUMENTS

| | | | |
|---|---|---|---|
| JP | 09281991 A | * | 10/1997 |
| WO | 2022006144 A2 | | 1/2022 |

OTHER PUBLICATIONS

PCT International Search Report and Written Opinion for International Application No. PCT/US2021/041412 dated Dec. 9, 2022, 17 pages.

(Continued)

*Primary Examiner* — Harry S Hong

(74) *Attorney, Agent, or Firm* — Lowenstein Sandler LLP

(57) ABSTRACT

Methods and systems for audio-based polling during a conference call discussion are provided. During a conference call, a user selection of an element on a client device is detected. The element is designated to initiate audio-based polling of participants of the conference call. In response to the detection of the user selection of the element on the client device, a verbal statement provided by a first participant of the conference call is recorded. A determination is made of whether the recorded verbal statement includes a question that is to be used for audio-based polling of one or more second participants of the conference call. Responsive to a determination that the verbal statement includes the question that is to be used for audio-based polling, audio-based polling of the one or more second participants is initiated.

20 Claims, 7 Drawing Sheets

(56) References Cited

U.S. PATENT DOCUMENTS

| | | |
|---|---|---|
| 11,328,796 B1 | 5/2022 | Jain et al. |
| 2002/0085030 A1 | 7/2002 | Ghani |
| 2006/0286530 A1 | 12/2006 | Forrest et al. |
| 2007/0100938 A1 | 5/2007 | Bagley et al. |
| 2008/0120101 A1 | 5/2008 | Johnson et al. |
| 2008/0146342 A1 | 6/2008 | Harvey et al. |
| 2011/0231226 A1 | 9/2011 | Golden |
| 2011/0271204 A1* | 11/2011 | Jones ............ G06Q 10/10 715/753 |
| 2013/0166279 A1 | 6/2013 | Dines et al. |
| 2014/0229866 A1 | 8/2014 | Gottlieb |
| 2015/0206156 A1 | 7/2015 | Tryfon et al. |
| 2016/0044226 A1 | 2/2016 | Williams |
| 2016/0078458 A1 | 3/2016 | Gold et al. |
| 2017/0004515 A1 | 1/2017 | Wilmot et al. |
| 2018/0122256 A1 | 5/2018 | Smith et al. |
| 2018/0189382 A1 | 7/2018 | Mowatt |
| 2018/0232752 A1 | 8/2018 | Badereddin et al. |
| 2018/0359530 A1 | 12/2018 | Marlow et al. |
| 2019/0073348 A1 | 3/2019 | Cheesman |
| 2019/0088153 A1 | 3/2019 | Bader-Natal et al. |
| 2019/0124128 A1 | 4/2019 | Bader-Natal et al. |
| 2020/0042916 A1 | 2/2020 | Jaiswal et al. |
| 2020/0074294 A1 | 3/2020 | Long et al. |
| 2020/0074873 A1 | 3/2020 | Alsarhan et al. |
| 2020/0334697 A1 | 10/2020 | Badereddin et al. |
| 2020/0380468 A1 | 12/2020 | Crawford et al. |
| 2021/0150155 A1 | 5/2021 | Kim et al. |
| 2021/0191925 A1 | 6/2021 | Sianez |
| 2021/0279622 A1 | 9/2021 | Bui et al. |
| 2021/0377063 A1 | 12/2021 | Cutler et al. |
| 2022/0114142 A1 | 4/2022 | Madisetti et al. |
| 2022/0138470 A1 | 5/2022 | Seleskerov et al. |

OTHER PUBLICATIONS

PCT International Search Report and Written Opinion for International Application No. PCT/US2021/039668 dated Jan. 20, 2022, 20 pages.

Grosvenor, Carrie, "Family Feud: The Rules of the Game", Sep. 25, 2018, liveabout, retrieved on Oct. 22, 2021, retrieved from <https://www.liveabout.com/family-feud-brief-overview-1396911 >, pp. 1-3 (Year: 2018).

Heinrich, Steve, "Qui plash: New Party Game Expands Audience Participation to 10, 1000", Jun. 30, 2015, PlayStation Blog, V retrieved on Oct. 22, 2021, retrieved from <https://blog.playstation.com/2015/06/30/quiplash-new-party-game-expands-audience-participation-to-10000/>, pp. 1-4 (Year: 2015).

PCT International Search Report and Written Opinion for International Application No. PCT/US2022/041592 dated Mar. 16, 2023, 23 pages.

\* cited by examiner

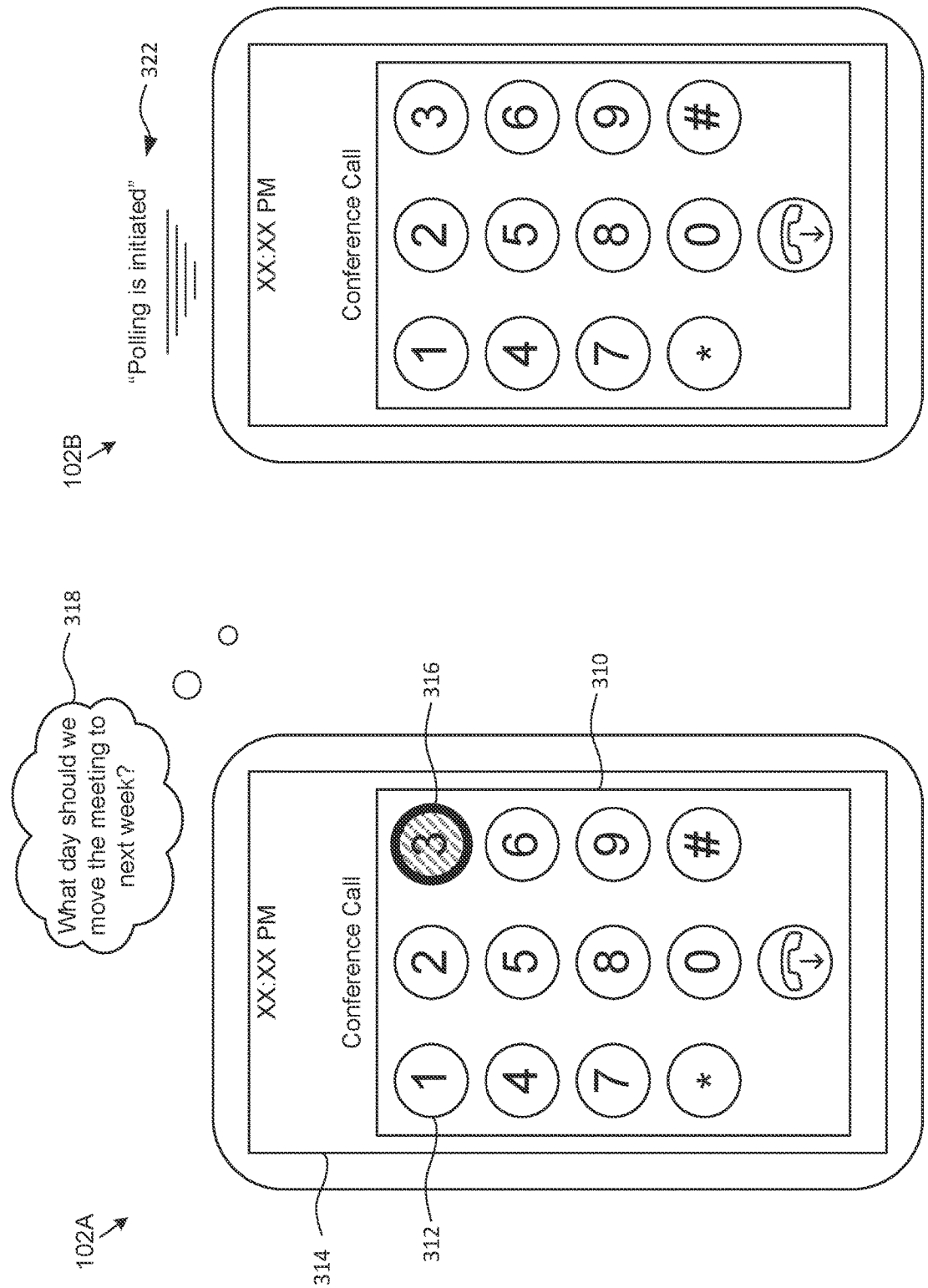

AUDIO-BASED POLLING DURING A CONFERENCE CALL DISCUSSION

RELATED APPLICATIONS

This non-provisional application claims priority to U.S. Provisional Patent Application No. 63/237,370 filed on Aug. 26, 2021 and entitled "AUDIO-BASED POLLING DURING A CONFERENCE CALL DISCUSSION," which is incorporated by reference herein.

TECHNICAL FIELD

Aspects and implementations of the present disclosure relate to audio-based polling during a conference call discussion.

BACKGROUND

Video or audio-based conference call discussions can take place between multiple participants via a conference platform. A conference platform includes tools that allow multiple client devices to be connected over a network and share each other's audio data (e.g., voice of a user recorded via a microphone of a client device) and/or video data (e.g., a video captured by a camera of a client device, or video captured from a screen image of the client device) for efficient communication. A conference platform can also include tools to allow a participant of a conference call to pose a question to other participants (e.g., via a conference platform user interface (UI)) during the conference call discussion to solicit responses (referred to as polling). The conference platform can collect responses provided by the other participants and generate polling results.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for audio-based polling during a conference call discussion. In an implementation, a user selection of an element on a client device is detected during a conference call. The element is designated to initiate audio-based polling of participants of the conference call. In response to the detection of the user selection of the element on the client device, a verbal statement provided by a first participant of the conference call is recorded. A determination is made of whether the recorded verbal statement includes a question that is to be used for audio-based polling one or more second participants of the conference call. Responsive to a determination that the verbal statement includes the question that is to be used for audio-based polling, audio-based polling of the one or more second participants is initiated.

In some implementations, an additional system and method are disclosed for audio-based polling during a conference call discussion. In an implementation, a request is received from a first participant of a conference call to initiate audio-based polling of one or more second participants of the conference call. Audio provided by the one or more second participants within a particular interval of time after the request to initiate audio-based polling is received is recorded. A determination is made of whether the recorded audio includes one or more verbal statements provided by the one or more second participants within the particular interval of time. In response to a determination that the recorded audio includes the one or more verbal statements, a textual form of the verbal statements is provided to at least one of the first participant or an organizer of the conference call.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 3A-D illustrate audio-based polling via a client device, in accordance with implementations of the disclosure.

DETAILED DESCRIPTION

Figure 1:
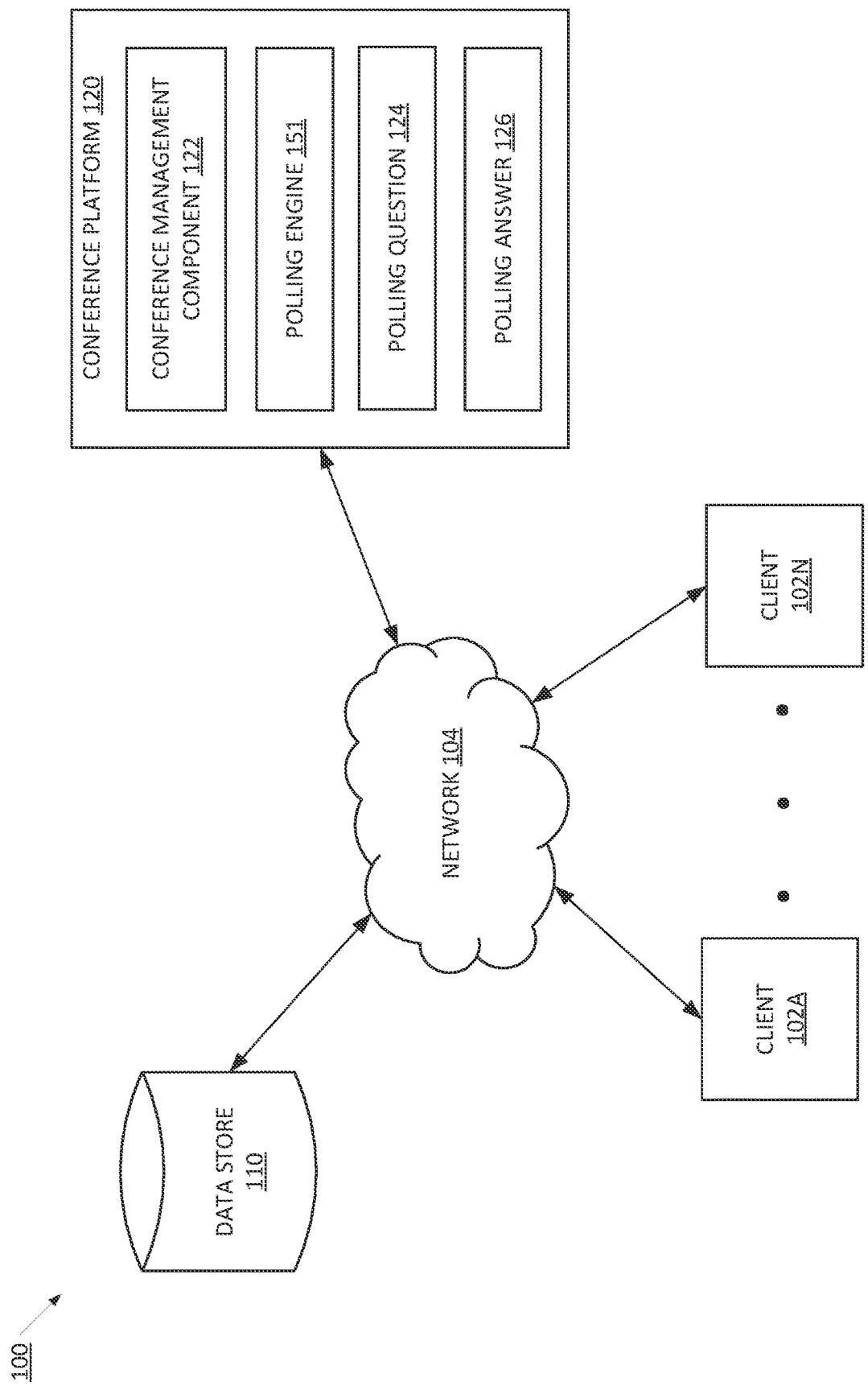
FIG. 1 illustrates an example system architecture, in accordance with implementations of the present disclosure.

Aspects of the present disclosure relate to audio-based polling during a conference call discussion. A conference platform can enable video or audio-based conference call discussions between multiple participants via respective client devices that are connected over a network and share each other's audio data (e.g., voice of a user captured via a microphone of a client device) and/or video data (e.g., a video captured by a camera of a client device) during a conference call. In some instances, a conference platform can enable a significant number of client devices (e.g., up to one hundred or more client devices) to be connected via the conference call.

A participant of a conference call may want to pose a question to the other participants of the conference call to solicit responses from the other participants (referred to herein as polling). The participant can provide a polling question during the conference call and the conference platform can collect responses provided by other participants of the conference call. Some existing conference platforms can provide a user interface (UI) to each client device connected to the conference call (referred to as a conference UI herein), where the UI displays the video data and/or audio data shared over the network, and can also display messages exchanged between participants during the conference call. The participant that wants to pose a polling question can pose the polling question to the other participants by causing the client devices associated with the other participants to display a message based on the polling question. For example, the participant can select a polling option in the UI of the conference platform and type the polling question in a designated area of the conference platform UI at a client device. In response to receiving the polling question, the conference platform can generate a message based on the polling question and cause the message to be displayed via the conference platform UI at the client devices associated with the other participants.

In some instances, a conference call discussion can be a purely audio-based conference call discussion. For example, a respective client device of a participant to the conference call can generate audio data (e.g., the voice of the participant captured via a microphone of the respective client device) without generating video data during the call, and the conference platform can share the audio data with the other conference call participants via the network. In other instances, a conference call discussion can be a hybrid conference call discussion. In such instances, the respective client devices of some participants to the discussion share audio data and video data over the network (referred to as video participants herein), and the respective client devices of other participants to the discussion share only audio data via the network (referred to as audio participants herein). In some instances. audio participants may not connect with other participants of the conference call (e.g., video participants and/or other audio participants) via the UI provided by the conference platform and instead may connect via a UI provided by another application running on the respective client device (e.g., a telecommunication application, etc.). In other or similar instances, audio participants may connect with the other participants of the conference call using other telecommunication techniques (e.g., by dialing a telephone number and/or conference identification number designated for the conference call via a keypad of a telephone device).

As indicated above, in conventional systems, a conference call participant that wants to pose a polling question to other participants poses the polling question via the conference platform UI and the other participants can respond to the polling question via the conference platform UI during the conference call discussion. Given that some audio participants may connect with the other conference call participants via a UI provided by another application or using other telecommunication techniques, a participant may not be able to pose the polling question to such audio participants, and the audio participants may not be able to respond to the polling question, during the conference call. The conference call participant that poses the polling question can request that the audio participants provide their response using alternative means (e.g., by providing their response in person, by providing their response via an electronic communication following the conference call discussion, etc.). However, asking the audio participants to submit their responses using the alternative means can further interrupt the organization and/or the natural flow of the conference call, which further prevents participants from efficiently discussing each topic for the conference call. In addition, the participant that posed the polling question may consume additional system resources to record and track the polling question responses provided by the participants via the conference platform UI and the audio participants via the requested alternative means. Accordingly, even fewer system resources are available to other processes, both on the client devices and computing devices hosting the conference platform, reducing an overall efficiency and increasing an overall latency for the client device and the computing devices.

Implementations of the present disclosure address the above and other deficiencies by providing audio-based polling during a conference call discussion. A conference platform can enable client devices to connect participants to a conference call. In some embodiments, the conference call can be a video-based conference call, an audio-based conference call, or a hybrid conference call. A video-based conference call refers to a conference call where the respective client devices of each participant to the conference call generate audio data (e.g., voice of the participant captured via a microphone of the respective client device) and video data (e.g., a video captured by a camera of the respective client device) during the conference call discussion. An audio-based conference call refers to a conference call where the respective client devices of each participant of the conference call generate audio data and not video data during the conference call discussion. A hybrid conference call refers to a conference call where the respective client devices of some participants to the conference call generate audio data and video data during the conference call (referred to as video participants herein), and the respective client devices of other participants to the conference call generate audio data and not video data during the conference call (referred to as audio participants herein). In some embodiments, video participants can connect with other video participants and/or audio participants via a user interface (UI) provided by the conference platform (referred to as a conference UI herein). In some embodiments, audio participants can connect with other audio participants and/or video participants via a conference UI, a UI provided by another application running on respective client devices associated with the audio participants (referred to as an application UI herein), and/or using other telecommunication techniques (e.g., by dialing a telephone number and/or conference identification number designated for the conference call via a keypad of a telephone device).

During the conference call discussion, the conference platform can detect a user selection of an element on a client device. The element on the client device can be associated with initiating and/or providing data or information to execute multiple different processes. For example, a participant associated with the client device may be connecting with other participants (e.g., audio and/or video participants) of the conference call via an application UI provided by a telecommunication application (e.g., a telephone application) running on the client device. The telecommunication application can provide a numerical keypad (e.g., a telephone keypad) that includes one or more numerical keys. A user associated with the client device can dial a telephone number (e.g., associated with another client device, designated for the conference call, etc.) by engaging with (e.g., selecting, clicking, tapping, etc.) a numerical key of the numerical keypad that corresponds to a respective value of the telephone number. One or more numerical keys of the numerical keypad can be designated (e.g., by the conference platform) as an element of the client device that is configured to initiate audio-based polling of one or more participants of the conference call, in some embodiments.

In another example, a participant associated with the client device may be connecting with other participants (e.g., audio and/or video participants) of the conference call via a telephone device (e.g., a feature telephone device, an enterprise telephone device, etc.). The telephone device may not include an input/output (IO) component that enables a user to consume particular types of content and/or data via a UI of the telephone device (e.g., a video feed generated by client deceives associated with one or more other participants of the conference call, notifications generated and provided by the conference platform, etc.). A user associated with the telephone device can dial a telephone number (e.g., associated with another client deice, designated for the conference call, etc.) via a numerical keypad of the telephone device. For example, the participant associated with the telephone device can dial a telephone number and/or a conference identification number designated for the conference call by engaging with (e.g., selecting, tapping, etc.) a numerical key of the numerical keypad that corresponds to a respective value of the telephone number and/or the conference identification number. One or more numerical keys of the numerical keypad of the telephone device can be designated (e.g., by the conference platform) as an element of the client device that is configured to initiate audio-based polling, in accordance with previously described embodiments.

Responsive to detecting the user selection of the element on the client device, the conference platform can determine that the participant of the conference call wants to initiate audio-based polling of one or more other participants of the conference call. The conference platform can cause the client device to record a verbal statement provided by the participant. As the participant provides the verbal statement, the client device can capture an audio signal corresponding to the verbal statement and can generate audio data (e.g., an audio file) based on the captured audio signal. The conference platform can cause the client device to stop recording in response to receiving an indication that the participant has finished providing the verbal statement. For example, the conference platform can detect that another user selection of the element, or another element on the client device that is designated (e.g., by the conference platform) to terminate the audio recording.

After the client device has stopped recording audio provided by the participant, the conference platform can determine whether the recorded verbal statement includes a question that is to be used for audio-based polling. In some embodiments, the conference platform can determine that the recorded verbal statement is to be used for audio-based polling based on the indication that the participant interacted with the designated element on the client device that is configured to initiate audio-based polling. In other or similar embodiments, the conference platform can determine whether the recorded verbal statement is to be used for audio-based polling by providing data associated with the verbal statement (e.g., the audio file generated by the client device, a set of text strings that includes a textual version of the verbal statement, etc.) as input to a trained machine learning model. The machine learning model may be trained to predict whether a given verbal statement corresponds to a question to be used for polling participants of a conference call. The conference platform can determine whether the recorded verbal statement is to be used for audio-based polling based on one or more outputs of the trained machine learning model.

In response to determining that the verbal statement includes a question that is to be used for audio-based polling, the conference platform can initiate audio-based polling of one or more other participants of the conference call. In some embodiments, the conference platform can transmit a notification to the client devices associated with the one or more other participants indicating that audio-based polling has been initiated. Each client device that receives the notification can provide the notification to the participant associated with the respective client device (e.g., via the conference UI, via the application UI, as an audio message, etc.), in some embodiments. The conference platform can cause each client device associated with the one or more participants to record audio provided by the respective one or more participants, in accordance with previously described embodiments. In some embodiments, the conference platform may receive an indication that one or more participants has opted out of audio-based polling (e.g., before initialization of the conference call, responsive to providing the notification that audio-based polling is initiated, etc.). In such embodiments, the conference platform may not cause the recording device associated with such participants to record audio provided by the one or more participants.

In some embodiments, the conference platform can record the audio provided by the one or more participants of the conference call (e.g., which have not opted out of audio-based polling) within a particular interval of time after the audio-based polling is initiated. During the particular interval of time, one or more participants of the conference call can provide a verbal statement corresponding to an answer to the polling question. The respective client devices associated with the one or more participants can capture an audio signal corresponding to a respective verbal statement and can generate audio data (e.g., an audio file) based on the captured audio signal. The conference platform can cause the client device to stop recording at the end of the particular interval of time. The conference platform can collect audio data generated by client devices associated with one or more participants that provided verbal statements in response to the polling question and can provide a textual form of the verbal statements to the participant that posed the polling question, an organizer of the conference call etc. For example, the conference platform can collect the audio data associated with the verbal statements provided by the one or more participants and can generate a file that includes an indication of the polling question and an indication of the answers included in the provided verbal statements.

Aspects of the present disclosure provide a mechanism for a participant of an audio-based conference call and/or a hybrid conference call to participate in audio-based polling during the conference call discussion in an effective and seamless manner. Embodiments of the present disclosure provide that a conference platform can designate an element on a client device (e.g., a numerical key of a keypad of a telecommunication application, a numerical key of a keypad of a telephone device, etc.) to be configured to initiate audio-based polling. Responsive to engaging with the element, a participant can provide the polling question verbally and disengage and/or re-engage with the element when the participant is finished providing the polling question. The conference platform can detect that the participant has provided a verbal polling question and can automatically record audio of the other participants as the other participants provide a verbal answer to the polling question. Accordingly, embodiments of the present disclosure enable participants of an audio-based conference call and/or a hybrid conference call to poll other participants of the conference call without requesting that audio participants of the conference call provide their response using alternative means, such as providing their response in person, via an electronic communication following the conference call discussion, etc. Instead, conference call participants can present a polling question according to a natural flow of a conference call discussion and can solicit responses to the polling question without interrupting the natural flow and/or organization of the discussion.

In addition, embodiments of the present disclosure provide that the conference platform can generate a report indicating the polling question and/or the verbally provided answers to the polling question and can provide the report to the participant that posed the polling question and/or an organizer of the conference call. An organizer of a conference call can collect responses to one or more polling questions posed during the conference call discussion without following up with participants via alternative means during or after the conference call. Thus, the participants of the conference call can efficiently conduct the conference call discussion with a reduced number of interruptions, thereby reducing the length of the conference call discussion. As a result of reducing the length of a conference call discussion, the amount of system resources utilized to facilitate the connection between client devices associated with each participant is decreased. Therefore, more system resources are available at the client devices and other computing devices for other processes, resulting in an increase of overall efficiency and a decrease in overall latency.

FIG. 1 illustrates an example system architecture 100, in accordance with implementations of the present disclosure. The system architecture 100 (also referred to as "system" herein) includes client devices 102A-N, a data store 110, a conference platform 120, and one or more server machines 130-150, each connected to a network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video data, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by conference platform 120 or one or more different machines (e.g., server machines 130-150) coupled to the conference platform 120 via network 104.

Conference platform 120 can enable users of client devices 102A-N to connect with each other via a conference call, such as a video conference call or an audio conference call. A conference call refers to an audio-based call and/or a video-based call in which participants of the call can connect with multiple additional participants. Conference platform 120 can allow a user to join and participate in a video conference call and/or an audio conference call with other users of the platform. Although embodiments of the present disclosure refer to multiple participants (e.g., 3 or more) connecting via a conference call, it should be noted that embodiments of the present disclosure can be implemented with any number of participants connecting via the conference call (e.g., 2 or more).

As indicated above, in some embodiments, a conference call can be a video-based conference call, an audio-based conference call, or a hybrid conference call. A video-based conference call refers to a conference call where the respective client devices of each participant to the conference call generates audio data (e.g., voice of the participant captured via a microphone of the respective client device) and video data (e.g., a video captured by a camera of the respective client device) during the conference call discussion. An audio-based conference call refers to a conference call where the respective client devices of each participant of the conference call generates audio data and not video data during the conference call discussion. A hybrid conference call refers to a conference call where the respective client devices of some participants to the conference call generates audio data and video data during the conference call (referred to as video participants herein), and the respective client devices of other participants to the conference call generates audio data and not video data during the conference call (referred to as audio participants herein).

The client devices 102A-N may each include computing devices such as personal computers (PCs), laptops, mobile phones, smart phones, tablet computers, netbook computers, network-connected televisions, etc. In some implementations, client devices 102A-N may also be referred to as "user devices." Each client device 102A-N can include a web browser and/or a client application (e.g., a mobile application or a desktop application). In some implementations, the web browser and/or the client application can display a user interface (UI), provided by conference platform 120, for users to access conference platform 120. Such UI may be referred to as a conference UI or conference GUI herein. In one example, a user can join and participate in a video conference call or an audio conference call via a UI provided by conference platform 120 and presented by the web browser or client application.

In other or similar embodiments, a user can join and participate in a conference call via a UI provided by another application running on a client device 102 associated with the user. For example, a telecommunication application (e.g., a telephone application can run on a client device 102A-N. The telecommunication application can provide a numerical keypad (e.g., a telephone keypad) that includes one or more numerical keys. A user associated with the client device 120A-N can dial a telephone number (e.g., associated with another client device, etc.) by engaging with (e.g., selecting, clicking, tapping, etc.) a numerical key of the numerical keypad that corresponds to a respective value of the telephone number. In some embodiments, a user associated with the client device 102A-N can join and participate in the conference call by dialing a telephone number and/or a conference code associated with the conference call via the numerical keypad of the telecommunication application UI. In some instances, the client device 102A-N associated with the user may generate audio data based on one or more verbal statements provided by the user during the conference call, but may not generate video data associated with the user during the conference call. Accordingly, a user that is connected to the conference call via the telecommunication application UI may be an audio participant.

In additional or alternative embodiments, a user can join and participate in a conference call using other telecommunication techniques. For example, a client device 102A-N associated with a user can be a telephone device (e.g., a feature telephone device, an enterprise telephone device, etc.). In some embodiments, the telephone device may not include an input/output (IO) component that enables a user to consume particular types of content and/or data via a UI of the telephone device (e.g., a video feed generated by client deceives associated with one or more other participants of the conference call, notifications generated and provided by the conference platform, etc.). Accordingly, the telephone device may not provide the conference UI and/or the application UI to the user associated with the telephone device. A user associated with the telephone device can dial a telephone number (e.g., associated with another client deice, designated for the conference call, etc.) via a numerical keypad of the telephone device. In some embodiments, the user can join and participate in a conference call by dialing a telephone number and/or a conference code associated with the conference call by engaging with (e.g., selecting, tapping, etc.) a numerical key of the numerical keypad that corresponds to a respective value of the telephone number and/or the conference identification number. The telephone device associated with the user may generate audio data based on one or more verbal statements provided by the user during the conference call, but may not generate video data associated with the user during the conference call. Accordingly, a user that is connected to the conference call via the telecommunication application UI may be an audio participant.

In some embodiments, client device 102A-N can include an audiovisual component that can generate audio and video data to be streamed to conference platform 120. In some implementations, the audiovisual component can include a device (e.g., a microphone) to capture an audio signal representing speech of a user and generate audio data (e.g., an audio file) based on the captured audio signal. The audiovisual component can include another device (e.g., a speaker) to output audio data to a user associated with a particular client device 102A-N. In some implementations, the audiovisual component can also include an image capture device (e.g., a camera) to capture images and generate video data of the captured images.

In some implementations, conference platform 120 can include a conference management component 122. Conference management component 122 is configured to manage a conference call between multiple users of conference platform 120. In some implementations, conference management component 122 can provide the conference UI to one or more client devices 102A-N to enable users to watch and/or listen to each other during a conference call. Conference management component 122 can also collect and provide information associated with the conference call to each participant of the call. For example, conference management component 122 can detect a particular user that is talking during the conference call and provide a notification to each client device associated with the conference call including an identifier of the particular user. In some instances, the conference management component 122 and/or components of each respective client device 102A-N can modify the conference UI, or the UI of another application running on the respective client device 102A-N, based on the notification.

As described previously, an audiovisual component of each client device can capture audio signals representing speech of a user and generate audio data based on the captured audio signal. For example, a participant to a conference call can provide a verbal statement. The audiovisual component of the client device 102 associated with the participant can capture audio signals recognizing the verbal statement provided by the participant and generate audio data (e.g., an audio file) based on the captured audio signal. In some embodiments, the audiovisual component of the client device 102 may initiate the recording and generation of audio data in response to detecting that a user associated with the client device 102 has interacted with one or more GUI elements included in a UI (e.g., a conference UI or a UI of another application) provided via the client device 102. In other or similar embodiments, the audiovisual component of client device 102 may initiate the recording and generation of audio data in response to detecting that a user has interacted with an element of the client device 102. For example, the audiovisual component of client device 102 may initiate the recording and generation of audio data in response to detecting that a user has interacted with a particular element of the client device 102 (e.g., a button associated with a particular number of a keypad of the client device 102, etc.). Further details regarding the recording and generation of audio data are provided herein.

In some implementations, the client device 102 can transmit the generated audio data to conference management component 122. In some embodiments, conference management component 122 can generate, based on the received audio data, one or more text strings including verbal statements provided by the participant. For example, conference management component 122 can convert an audio file received from a client device 102A-N into a file including the one or more text strings. Conference management component 122 can store the one or more text strings, or the file including the one or more text strings, at data store 110. In some embodiments, conference management component 122 can store the audio data (e.g., the received audio file) at data store 110 as well. In other or similar embodiments, client device 102 can generate one or more text strings including verbal statements provided by the participant based on the generated audio data. In such embodiments, client device 102 can transmit the one or more text strings to conference management component 122 (with or without the audio file) and conference management component 122 can store the one or more text strings (and in some embodiments, the audio file) at data store 110, as described above.

In some embodiments, an audiovisual component of a client device 102 can generate audio data at multiple instances during the conference call. For example, each instance that a participant of the conference call provides a verbal statement, the audiovisual component of the client device 102 associated with the participant can generate audio data based on the verbal statement. Conference management component 122 and/or an application running at client device 102 can generate separate text strings that include each verbal statement provided by a participant of the conference call as each verbal statement is recorded at a respective client device 102. During or after completion of the conference call (e.g., after each participant of the call has ended a connection between a client device and the conference platform), conference management component 122 can generate a transcript of the conference call based on each separate generated text string. In other or similar embodiments, conference management component 122 can receive audio data generated for each participant (e.g., from each client device 102A-N) after completion of the conference call. In such embodiments, conference management component 122 can generate text strings that include verbal statements provided by each participant of the conference call after completion of the conference call. Each text string generated after completion of the conference call may be included in a conference call transcript stored at data store 110. In some embodiments, a conference call transcript may be generated by conference management component 122

Polling engine 151 can enable participants of a conference call to poll other participants during the conference call. A participant can poll other participants of a conference call by posing a question (referred to as a polling question 124) to the other participants to solicit responses (referred to as a polling answer 126) to the question 124. In some embodiments, a participant can verbally pose a question 124 for polling other participants of the conference call. In some embodiments, conference platform 120 can designate a particular element of client device 102A-N to be configured to initiate audio-based polling for one or more participants of an audio-based conference call and/or a hybrid conference call. For example, as described above, one or more participants of a conference call can join and participate in the conference call via a telecommunication application that provides a UI including a numerical keypad. In some embodiments, conference platform 120 can designate a particular numerical key of the numerical keypad to be configured to initiate audio-based polling of participants of the conference call. In another example, as described above, one or more participants of a conference call can join and participate in the conference call via a telephone device (e.g., a feature telephone device, an enterprise telephone device, etc.). Conference platform 120 can designate a numerical key of the numerical keypad to be configured to initiate audio-based polling of participants of the conference call.

In response to detecting that a participant has engaged with a designated element of client device 102A-N, conference management component 122 can cause an audiovisual component at or coupled to the client device 102A-N to initiate a recording function. The audiovisual component can record a polling question that is verbally provided by the participant by capturing an audio signal including the verbally provided polling question. Client device 102A-N can generate audio data (e.g., an audio file) based on the captured audio signal. Conference management component 122 can detect that the participant has finished providing the verbal question (e.g., the participant has disengaged the designated element, the participant has re-engaged with the designated element, etc.). Responsive to detecting that the participant has finished providing the verbal question, conference management component 122 can cause the audiovisual component to terminate the recording function, in some embodiments. In other or similar embodiments, conference management component 122 can cause the audiovisual component to terminate the recording function responsive to determining that a particular amount of time has passed since the participant initially interacted with the designated element. The client device 102A-N can transmit the audio data that includes the verbally provided question to polling engine 151, in some embodiments. In some embodiments, the client device 102A-N can convert the audio data to one or more text strings that includes a textual form of the verbally provided question and transmit the one or more text strings to polling engine 151 (with or without the audio data). In some embodiments, the client device 102A-N can transmit a message to polling engine 151 indicating that the audio data and/or the one or more text strings were generated in response to the participant engaging with the designated element of client device 102A-N. Polling engine 151 can determine, based on the message, that the verbally provided question correspond to a polling question 124 and can provide the question as a polling question 124 to other participants of the conference call, in accordance with embodiments provided herein. In other or similar embodiments, polling engine 151 can initiate audio-based polling at one or more client devices 102A-N associated with other participants of the conference call, in accordance with embodiments provided herein.

In another example, a conference UI provided by conference platform 120 can include a UI element that is configured to initiate polling of participants of the conference call (referred to as a polling question UI element herein). A participant of the conference call can interact with (e.g., engage) the polling question UI element (i.e., via the conference UI). The polling question UI element can be configured to cause the audiovisual component to initiate a recording function. Responsive to detecting that the participant has interacted with the polling question UI element, the audiovisual component of client device 102A-N associated with the participant may record a polling question that is verbally provided by the participant. In some embodiments, conference management component 122 can cause the audiovisual component to terminate the recording in response to detecting that the participant has finished providing the verbal question (e.g., the participant has disengaged the GUI element, the participant has re-engaged with the GUI element, etc.). In other or similar embodiments, conference management component 121 can cause the audiovisual component to terminate the recording in response to determining that a particular amount of time has passed since the participant initially interacted with the polling question UI element. Responsive to the audiovisual component terminating the recording, client device 102A-N can generate audio data associated with the verbal question provided by the participant. The client device 102A-N can transmit the audio data (and/or one or more text strings) that includes the verbal question to polling engine 151, in accordance with previously described embodiments. Polling engine 151 can determine, based on the message, that the verbal statement corresponds to a polling question 124 and can provide the verbal question as a polling question 124 to other participants of the conference call, in accordance with embodiments provided herein.

In some embodiments, the participant can verbally provide the question 124 for polling other participants without interacting with a UI element. For example, the participant can provide one or more verbal statements during a conference call. The audiovisual component of the client device 102A-N associated with the participant can generate audio data based on an audio signal recognizing the verbal statements and can transmit the generated audio data to conference management component 122, in accordance with previously described embodiments. In some embodiments, conference management component 122 can provide the audio data to polling engine 151. In additional or alternative embodiments, conference management component 122 can generate one or more text strings including the verbal statements and can provide the generated text strings to polling engine 151.

In some embodiments, polling engine 115 can provide the audio data and/or the text strings received from conference management component 122 as input to a trained machine learning model. The machine learning model can be trained to receive, as an input, one or more verbal statements (i.e., as audio data and/or as one or more text strings) and provide, as output, a level of confidence that a verbal statement includes a question associated with polling. In some embodiments, the machine learning model can be trained based on verbal statements that have been previously provided by users of a platform for polling other users of the platform. The platform can receive the verbal statements (e.g., as audio data, as a text string, etc.) from a client device and can store the received verbal statements at data store 110, in some embodiments. For example, the platform can be a conference platform 120 and the platform can receive verbal statements including questions that were used for polling from a client device, in accordance with previously described embodiments. In another example, the platform can be a collaboration platform (not shown) that is configured to enable users to prepare surveys for polling other users of the collaboration platform. A user can provide (e.g., via a UI provided by the collaboration platform) one or more questions to be included in the survey. The verbal statements used to train the model can include the one or more user-provided questions to be included in the survey.

A training engine (not shown) can generate training data based on the previously provided verbal statements at data store 110. The training data can include a set of training inputs and a corresponding set of target outputs. The set of training inputs can include a phrase (e.g., audio data, a text string) previously provided by a user of the platform and, in some embodiments, can include one or more attributes associated with the previously provided phrase. An attribute can include an indication of whether a respective previously provided phrase includes a question, a question type associated with the previously provided question, and so forth. If a respective training input includes audio data (e.g., an audio recording) for a previously provided phrase, the attributes associated with the training input can include an identifier for a portion of the audio recording (e.g., a timestamp) at which an inflection of a user's voice corresponds to a question (e.g., the user's inflection is elevated to a higher pitch). The set of target outputs can include data pertaining to whether each respective previously provided phrase of the set of training inputs includes a question that was previously used for polling.

The training engine can train a machine learning model using the generated training data. In some embodiments, a machine learning model can refer to the model artifact that is created by the training engine using the training data that includes the set of training inputs and the set of corresponding target outputs (i.e., the correct answers for respective training inputs). The training engine can find patterns in the training data that map the training input to the target outputs (i.e., the answer to be predicted), and provide the machine learning model that captures these patterns. In some embodiments, the machine learning model can be composed of, for example, a single level of linear or non-linear operations (e.g., a support vector machine (SVM) or a deep network, i.e., a machine learning model that is composed of multiple levels of non-linear operations). An example of a deep network is a neural network with one or more hidden layers and such a machine learning model can be trained by, for example, adjusting weights of a neural network in accordance with a backpropagation learning algorithm, or the like.

In response to providing the audio data and/or the text strings as input to the trained machine learning model, polling engine 151 can receive an output of the trained machine learning model and determine, based on the received output, whether a level of confidence for a verbal statement satisfies a confidence criterion (e.g., whether the level of confidence for the verbal statement exceeds a threshold level of confidence). In response to determining the level of confidence satisfies the confidence criterion, polling engine 151 can designate the verbal statement as a polling question 124. Conference management component 122 can present the designated polling question 124 to the other participants of the conference call, in accordance with embodiments described herein.

Polling engine 151 can receive one or more answers 126 to a polling question 124 in response to presenting the polling question 124 to participants via the conference UI. For example, conference management component 122 can initiate audio-based polling at client devices 102A-N associated with one or more other participants of the conference call in response to receiving audio data associated with a verbal question provided by an audio participant, in accordance with previously described embodiments. Conference management component 122 can, in some embodiments, generate and transmit a message the client devices 102A-N associated with the one or more other participants indicating that audio-based polling is initiated. The client devices 102A-N associated with the one or more participants can provide the message to the participants (e.g., via the conference UI, via the application UI, via an audio message, etc.), in some embodiments. In some embodiments, a client device 102A-N can receive an indication that a participant wants to opt out of audio-based polling (e.g., responsive to detecting that the participant has engaged with a particular conference or application UI element, or a designated element of a telephone device). The client device 102A-N can transmit a notification of the indication to conference management component 122, and conference management component 122 may not initiate audio-based polling at the client device 102A-N.

Conference management component 122 can initiate audio-based polling at one or more client devices 102A-N by recording audio provided by each participant (i.e., that has not opted out of audio-based polling) associated with the one or more client devices 102A-N. After conference management component 122 initiates audio-based polling at a respective client device 102A-N, a respective participant associated with the client device 102A-N can provide a verbal answer to the polling question. The audiovisual component can capture an audio signal associated with the verbal answer and the client device 102A-N can generate audio data (e.g., an audio file) associated with the captured audio signal. The client device 102A-N can transmit the generated audio data to polling engine 151, in some embodiments. In other or similar embodiments, the client device 102A-N can convert the audio data to one or more text strings that include a textual form of the verbal question and transmit the one or more text strings to polling engine 151, in accordance with previously described embodiments.

In other or similar embodiments, polling engine 151 and/or conference management component 122 can modify the conference UI to present a textual form of a polling question 124. Polling engine 151 and/or conference management component 122 can further modify the conference UI to include one or more UI elements that allow a participant to provide an answer 126 to the polling question 124. In some embodiments, the one or more UI elements can allow the participant to provide a verbal answer to the polling question 124. For example, a client device 102 associated with a participant of a conference call can detect that the participant has interacted with the UI element (e.g., has engaged with the UI element) and can cause an audiovisual component of the client device 102 to initiate a recording function, in accordance with previously described embodiments. In response to detecting that the participant has completed providing the verbal answer (e.g., the participant has disengaged the UI element and/or has re-engaged with the UI element, etc.), the client device 102 can terminate the recording function and can transmit the audio data associated with the verbal answer to conference management component 122. In other or similar embodiments, the one or more UI elements can allow the participant to provide other types of answers 126 to the polling question 124. For example, the one or more UI elements can include a text box that enables the user to provide a textual answer to the polling question 124. In another example, the one or more UI elements can enable the user to select a polling answer 126 from a set of polling answers 126 associated with the polling question 124. A client device 102 associated with the participant can transmit data (e.g., textual data, audio data, etc.) associated with a response provided by a participant (i.e., a verbal answer or a non-verbal answer) to polling engine 151, in accordance with previously described embodiments.

In some embodiments, polling engine 151 can provide an indication of the one or more answers 126 to the polling question 124 to the participant that posed the question and/or an organizer of the conference call, in some embodiments. For example, polling engine 151 can generate a report indicating the polling question 124 and the one or more answers 126 to the polling question and can transmit the report to a client device associated with a user that posed the polling question 124 and/or the organizer of the conference call (e.g., during or after the conference call).

In some implementations, conference platform 120 can operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. In some implementations, the functions of conference platform 120 may be provided by a more than one machine. For example, in some implementations, the functions of conference management component 122 and polling engine 151 may be provided by two or more separate server machines. Conference platform 120 may also include a website (e.g., a webpage) or application back-end software that may be used to enable a user to connect with other users via the conference call.

In general, functions described in implementations as being performed by conference platform 120 can also be performed on the client devices 102A-N in other implementations, if appropriate. In addition, the functionality attributed to a particular component can be performed by different or multiple components operating together. Conference platform 120 can also be accessed as a service provided to other systems or devices through appropriate application programming interfaces, and thus is not limited to use in websites.

Although implementations of the disclosure are discussed in terms of conference platform 120 and users of conference platform 120 participating in a video and/or audio conference call, implementations can also be generally applied to any type of telephone call or conference call between users. Implementations of the disclosure are not limited to content sharing platforms that provide conference call tools to users.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the conference platform 120.

In situations in which the systems discussed here collect personal information about users, or can make use of personal information, the users can be provided with an opportunity to control whether conference platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the conference platform 120.

Figure 2:
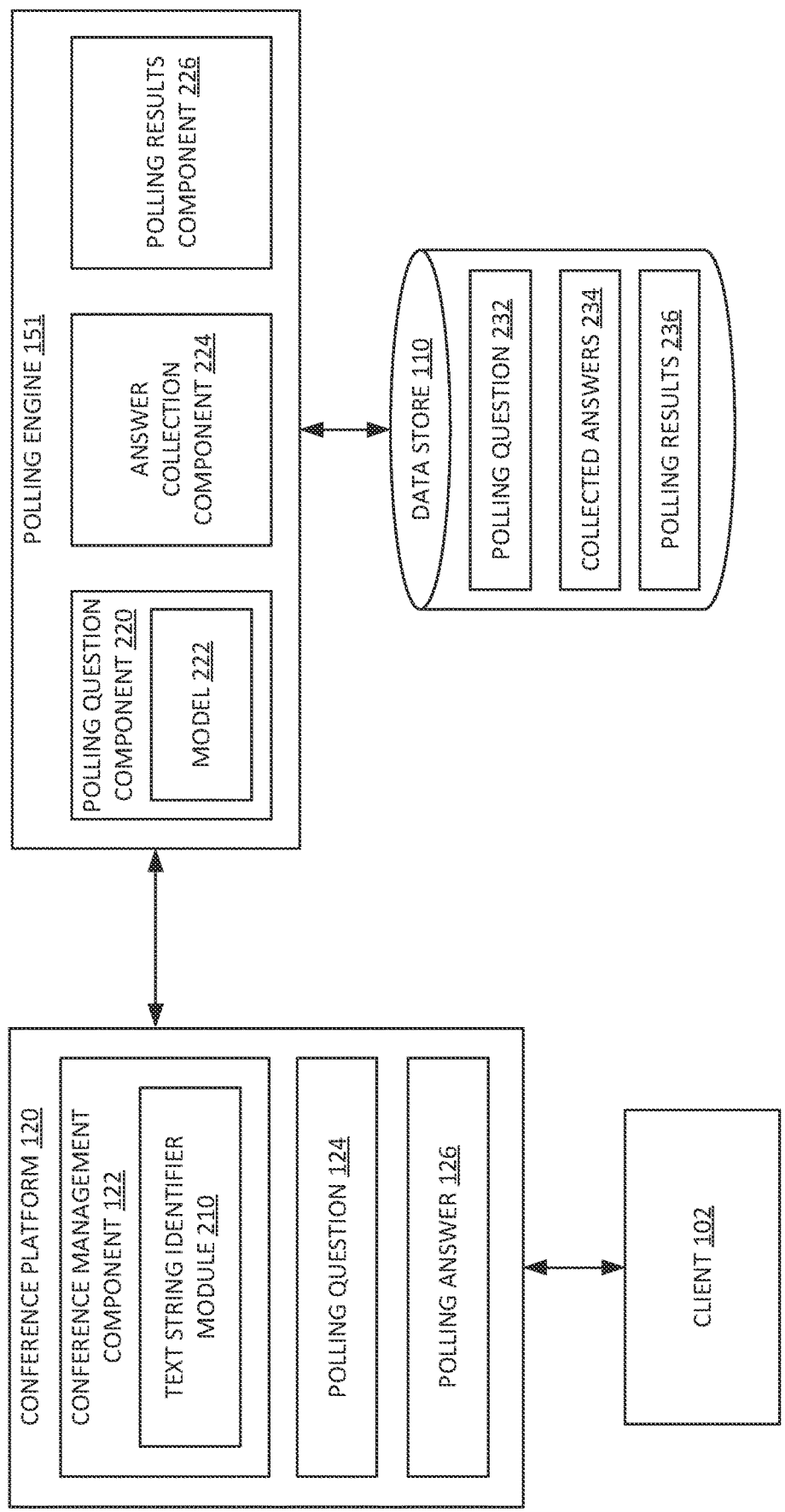
FIG. 2 is a block diagram illustrating a conference platform and a polling engine for the conference platform, in accordance with implementations of the present disclosure.

FIG. 2 is a block diagram illustrating a conference platform 120 and a polling engine 151, in accordance with implementations of the present disclosure. As described with respect to FIG. 1, conference platform 120 can provide tools to users of a client device 102 to join and participate in a video-based conference call, an audio-based conference call and/or a hybrid conference call. Conference platform 120 can include a conference management component 122. Conference management component 122 can include a text string identifier module 210 and a transcript generation module 212. Polling engine 151 can facilitate polling of conference call participants (e.g., video participants, audio participants, etc.). Polling engine can include a polling question component 220, an answer collection component 224, and a polling results component 226.

As described above, conference management component 120 can receive audio data and/or non-audio data from a client device 102. For example, during or after a conference call discussion (e.g., a video conference call discussion), conference management component 120 can receive an audio file from client device 102. The audio file can include a verbal statement (e.g., a verbal question) provided by a participant of the conference call during the conference call discussion. In some embodiments, the participant can provide the verbal statement in response to interacting (e.g., engaging with) an element of client device 102 that is designated to initiate audio-based polling of other participants. FIG. 3A illustrates an audio-based conference call and/or a hybrid conference call between multiple participants via conference platform 120, in accordance with some implementations. As described above, in some embodiments, a participant of a conference call can join and participate in an audio-based conference call and/or a hybrid conference call via an application UI provided by an application (e.g., a telecommunication application) running on a client device 102 associated with the participant. In other or similar embodiments, the participant can join and participant in the audio-based conference call and/or the hybrid conference call via the client device 102 using other telecommunication techniques.

FIG. 3A illustrates an example client device (i.e., client device 102A) associated with a first participant (e.g., Participant A) of an audio-based conference call and/or a hybrid conference call, in accordance with some implementations. Client device 102A can include one or more input/output (IO) components that enables a user to consume particular types of content and/or data via a UI of client device 102A (e.g., video data, electronic message data, etc.). In some embodiments, the one or more IO components can include a liquid crystal display (LCD) screen, a light-emitting diode (LED) display screen, an organic LED (OLED) display screen, an active matrix OLED (AMOLED) display screen, a super AMOLED display screen, am in-plane switching (IPS) display screen, etc. In other or similar embodiments, client device 102A may be a telephone device (e.g., a feature telephone device, an enterprise telephone device, etc.). In such embodiments, client device 102A may not include the one or more IO components that enable the user to consume the particular types of content and/or data via the UI of client device 102A.

Client device 102A can include a numerical keypad 310 that includes one or more numerical keys 312. In some embodiments, one or more numerical keys 312 of the numerical keypad 310 can correspond to a respective numerical digit (e.g., "1," "2," "3," etc.). In other or similar embodiments, one or more numerical keys 312 of numerical keypad 310 can be configured to initiate one or more processes associated with a respective numerical digit (e.g., "*," "#," etc.). As described above, in some embodiments, the numerical keypad 310 can be provided to a user of client device 102A via an application UI 314 (e.g., a telecommunication application UI, etc.). In other or similar embodiments, each numerical key 312 of numerical keypad 310 can correspond to a physical element of client device 102 (e.g., a button on a telephone device). It should be noted that although FIG. 3A illustrates numerical keypad 310 being provided by application UI 314 of client device 102A, embodiments of the present disclosure can also apply to a numerical keypad 310 of a telephone device.

In some embodiments, conference management component 122 can designate one or more numerical keys 312 of numerical keypad 310 to cause audio-based polling of participants of an audio-based conference call and/or a hybrid conference call to be initiated, as described above. For purposes of example only, such designated numerical key is referred to herein as designated numerical key 316. In some embodiments, conference management component 122 can designate the same one or more numerical keys 312 to cause audio-based polling to be initiated for all audio-based conference calls and/or hybrid conference calls hosted by conference platform 120. In other or similar embodiments, conference management component 122 can receive an indication (e.g., from a client device 102 associated with an organizer of the conference call, etc.) of one or more numerical keys 312 that are to be designated to initiate audio-based polling prior to or during an audio-based conference call and/or a hybrid conference call. Conference management component 122 can designate the one or more numerical keys 12 to initiate audio-based polling in response to receiving the indication.

In some embodiments, client device 102A can detect, during the conference call, that Participant A has engaged with designated numerical key 316. In response to client device 102A detecting that Participant A has engaged with key 316, conference management component 122 can determine that audio-based polling is initiated at client device 102A. Conference management component 122 can cause an audiovisual component at or coupled to client device 102A to capture an audio signal including a verbal statement 318 provided by Participant A. As illustrated in FIG. 318, Participant A can provide a verbal statement 318 that includes a question "What day should we move the meeting to next week?" Client device 102A can generate audio data (e.g., an audio file) based on the captured audio signal. In some embodiments, conference management component 122 can receive an indication that Participant A has finished providing the verbal statement 318. For example, client device 102A can detect that Participant A has disengaged key 316 and/or re-engaged key 316 and can transmit an indication of the detection to conference management component 122. In other or similar embodiments, client device 102A can determine that Participant A has not provided a verbal statement for a particular amount of time (e.g., Participant A has been silent for a particular amount of time). Client device 102A can transmit an indication that Participant A has not provided a verbal statement for the particular amount of time to conference management component 122. In response to receiving the indication that Participant A has finished providing the verbal statement 318, conference management component 122 can cause the audiovisual component at or coupled to client device 102A to stop recording.

In some embodiments, client device 102A can transmit the generated audio data (e.g., the audio file) associated with the verbal statement provided by Participant A to conference management component 122, as described above. In other or similar embodiments, client device 102A can convert the audio data to one or more text strings that includes a textual form of the verbal statement. Client device 102A can transmit the one or more text strings (with or without the audio data) to conference management component 122, as described above.

As described above, a conference call can be a hybrid conference call, in some embodiments (i.e., some participants are video participants and other participants are audio participants). Accordingly, a participant that wants to pose a polling question to other participants of the conference call may be a video participant, in some embodiments. In such embodiments, the video participant can join and participate in the conference call via a conference UI provided at a client device 102 associated with the video participant. In some embodiments, the conference UI can include one or more UI elements that are configured to initiate audio-based polling of other participants (e.g., audio participants, video participants, etc.) of the conference call. The client device 102 associated with the video participant can detect that the video participant has engaged with the UI element. Conference management component 122 can cause an audiovisual component at or coupled to the client device 102 to record the verbal statement by capturing an audio signal including the verbal statement provided by the video participant, as described above. The client device 102 can generate audio data (e.g., an audio file) associated with the video participant. Responsive to receiving an indication that the video participant has finished providing the verbal statement (e.g., responsive to client device 102 detecting that the video participant has disengaged and/or re-engaged with the UI element, etc.), conference management component 122 can cause the audiovisual component at or coupled to client device 102 to stop recording. Client device 102 can transmit the audio data associated with the verbal statement and/or one or more text strings including a textual form of the verbal statement to conference management component 122, in accordance with previously described embodiments. In some embodiments, client device 102 can also transmit a message to conference management component 122 indicating that the audio data was generated in response to detecting that Participant A engaged with the designated key 316.

In other or similar embodiments, a participant of a conference call (e.g., a video participant, an audio participant, etc.) can provide a verbal question for polling other participants of the conference call without engaging with a UI element of a conference UI or a designated element (e.g., designated key 316) of client device 102. For example, conference management component 122 can detect that a participant of a conference call (e.g., a video participant, an audio participant, etc.) has begun to provide a verbal statement during the conference call. Responsive to detecting that the participant has begun to provide the verbal statement, conference management component 122 can cause the audiovisual component at or coupled to a client device 102 associated with the participant to record the provided verbal statement, as described above. In response to detecting that the participant has finished providing the verbal statement (e.g., the participant has not provided any verbal statement for a particular amount of time, etc.), conference management component 122 can cause the audiovisual component at or coupled to the client device 102 to stop recording. The client device 102 can transmit the audio data associated with the verbal statement and/or one or more text strings including a textual form of the verbal statement to conference management component 122, in accordance with previously described embodiments. In some embodiments, client device 102 can also transmit a message to conference management component 122 indicating that the audio data was generated in response to detecting that the video participant engaged with the UI element.

Referring back to FIG. 2, text string identifier module 210 of conference management component 122 can identify one or more text strings that correspond to a verbal statement (e.g., a verbal question) provided during a conference call discussion. As described above, in some embodiments, a client device (e.g., client device 102A) can transmit an audio file including a recording of a verbal statement provided by a participant (e.g., Participant A) of a conference call. In response to receiving the audio file, text string identifier module 210 can convert the audio file to one or more text strings that include a textual form of the verbal question. Responsive to converting the audio file to the one or more text strings, text string identifier module 210 can provide the one or more text strings to polling question component 220 of polling engine 151. As also described above, in some embodiments, a client device 102 can transmit one or more text strings that include a textual form of a verbal statement to conference platform 120. In such embodiments, text string identifier module 210 may receive the one or more text strings and can provide the one or more received text strings to polling question component 220, as described above.

Polling question component 220 can be configured to determine whether a verbal statement provided by a participant of a conference call corresponds to a polling question that is to be used for polling other participants of the conference call. In some embodiments, polling question component 220 can determine that a verbal statement is to be used for polling other participants of the conference call based on an indication provided by the client device 102 that transmitted an audio file and/or one or more text strings to conference platform 120. For example, as described above, client device 102A can transmit a message with the audio file and/or the one or more text strings that indicates that a recording including a verbal statement was generated in response to detecting that Participant A engaged with designated key 316. In other or similar embodiments, the message can indicate that the recording was generated in response to detecting that a video participant engaged with a particular UI element of the conference UI. Accordingly, polling question component 220 can determine that the verbal question provided by Participant A corresponds to a polling question.

In some embodiments, each of the one or more text strings provided to polling question component 220 by text string identifier 210 can correspond to the textual form of a verbal question provided by the conference call participant. For example, if Participant A (or the video participant) engages a designated element of client device 102A (e.g., key 316) (or the particular UI element of the conference UI) prior to providing the verbal question and disengages and/or re-engages key 316 responsive to finishing the verbal question, the audio file generated by client device 102A may only include a recording of audio during the time period when Participant A provided the verbal question. In such embodiments, polling question component 220 can store each of the one or more text strings at data store 110 as polling question 232. In other or similar embodiments, a portion of the one or more text strings provided to polling question component 220 can correspond to the textual form of the verbal question and another portion of the one or more text strings can correspond to the textual form of another verbal statement provided by participant A. For example, if Participant A (or the video participant) engages key 316 prior to providing the verbal question and does not disengage and/or re-engage key 316 (or the particular UI element of the conference UI) responsive to finishing the verbal question (e.g., if Participant A forgets to disengage and/or re-engage key 316), the audio file generated by client device 102A may include a recording of audio during the time period when Participant A provided the verbal question and audio of another time period after participant A provided the verbal question. In such embodiments, polling question component 220 can identify a portion of the one or more text strings that corresponds to the verbal question and extract the identified portion from the one or more text strings.

In some embodiments, polling question component 220 can identify the portion of the one or more text strings by identifying one or more components of the one or more text strings that correspond to a question. For example, polling question component 220 can parse through each of the one or more text strings and determine whether each component (e.g., word, phrase, etc.) of the one or more text strings corresponds to a question. Responsive to determining that a respective component of the one or more text strings corresponds to a question, polling question component 220 can identify a portion of the one or more text strings that includes the component as corresponding to the question. In other or similar embodiments, polling question component 220 can provide the one or more text strings as input to a machine learning model 222 that is trained to predict whether a given input phrase (e.g., included in a given set of text strings, included in an audio file, etc.) corresponds to a polling question. In additional or alternative embodiments, polling question component 320 can provide an audio file received from client device 102 as input the model 222. Polling question component 220 can identify, based on one or more outputs of the model 222, a portion of the one or more text strings that correspond to the verbal question. Further details regarding the machine learning model 222 are provided below. Responsive to extracting the portion of the one or more text strings that corresponds to the textual form of the verbal question, Polling question component 220 can store the extracted portion at data store 110 as polling question 232.

As described above, in some embodiments, a participant of a conference call can provide a question for polling without interacting with a designated element of client device 102 or a UI element of a conference UI. In such embodiments, the audiovisual component of the client device 102 can generate audio data that includes a recording of one or more verbal statements provided by the participant and the client device 102 can transmit the audio data (e.g., an audio file) and/or one or more text strings including a textual form of the one or more verbal statements to conference platform 120, as described above. Polling question component 220 can obtain the audio file and/or the one or more text strings from conference management component 122, as described above, and can provide the one or more text strings and/or the audio file as input to model 222. Model 222 can be trained to predict whether a verbal statement provided by a participant of a conference call that corresponds to a polling question 126. Model 222 can receive, as input, one or more text strings including verbal statements provided by participants of a conference call and provide, as output, a level of confidence associated with the one or more text strings, the level of confidence indicating a likelihood that the one or more text strings includes a question for polling other participants of the conference call. In some embodiments, conference management component 122 can provide the audio data received from the client device associated with participant A as input to polling question model 220 in addition to or instead of the identified one or more text strings. For example, conference management component 122 can provide an audio file including an audio recording of the verbal statement as input to polling question model 220, in accordance with previously described embodiments.

In response to providing the one or more identified text strings (or the audio file including the verbal statement) as input to model 222, polling question component 220 can obtain, as an output, a level of confidence associated with verbal statement. Polling question component 220 can determine whether the verbal statement corresponds to a question for polling by determining whether the level of confidence associated with the verbal statement satisfies a confidence criterion. In some embodiments, polling question component 220 can determine a level of confidence satisfies a confidence criterion in response to determining the level of confidence associated with the verbal statement meets or exceeds a threshold level of confidence. In response to determining the level of confidence for the verbal statement satisfies the confidence criterion, polling question component 220 can designate the verbal statement as a question for polling other participants of the conference call. In response to designating the verbal statement as a question for polling, polling question component 220 can store the designated polling question as polling question 232 at data store 110.

In some embodiments, polling question component 220 and/or conference management component 122 can generate and transmit, to a client device 102 associated with the participant that provided a verbal statement that corresponds to polling question 232, a message inquiring whether the participant would like to pose the question to the other conference call participants. A client device 102 associated with the participant can provide the message to the participant (e.g., via the conference UI, via the telecommunication application UI, via an application UI associated with another application running on client device 102, etc.). For example, client device 102A can provide the message to Participant A via the application UI 314 or a UI of another application (e.g., a texting application, etc.) running on client device 102A. In another example, the client device 102 associated with a video participant that provided polling question 232 can provide the message via the conference UI. In some embodiments, the client device 102 associated with the participant can include one or more UI elements that enable the participant to provide an indication of whether the participant wants to pose the polling question 232 to other participants of the conference call. For example, the message can include a UI element (e.g., a button) that enables the participant to indicate that he, she, or they wants to pose the polling question 232 and another UI element (e.g., a button) that enables the participant to decline posing the polling question 232. In another example, the application UI and/or the conference UI can include a UI element (e.g., a text box) that enables the participant to provide an indication (e.g., by typing "yes," "no," etc.), of whether he, she, or they wants to pose the polling question 232. The client device 102 associated with the participant can detect that the participant has engaged with one of the UI elements included in the message and transmit a notification to conference management component 122 indicating the response provided by the participant.

In yet other or similar embodiments, the message can include a UI element that enables the participant to edit the polling question included in the provided message. For example, the application UI and/or the conference UI can include a UI element (e.g., a text box) that enables the participant to edit the polling question. The client device 102 associated with the participant can transmit a message indicating the edited polling question 232 to conference management component 122, in accordance with previously described embodiments.

In response to determining that polling question 232 is to be posed to other participants (e.g., audio participants, video participants, etc.) of the conference call, conference management component 122 can initiate audio-based polling on the client devices 102 associated with one or more of the other participants. FIG. 3B depicts a client device 102B associated with another participant (e.g., Participant B) of an audio-based conference call and/or a hybrid conference call. In some embodiments, Participant B can join and participate in the conference call via an application UI provided by a telecommunication application running on client device 102B, as described above. In other or similar embodiments, client device 102B can be a telephone device (e.g., a feature telephone device, an enterprise telephone device, etc.). Participant B can join and participate in the conference call via a telecommunication function of the telephone device, in accordance with previously described embodiments.

Figure 3D:
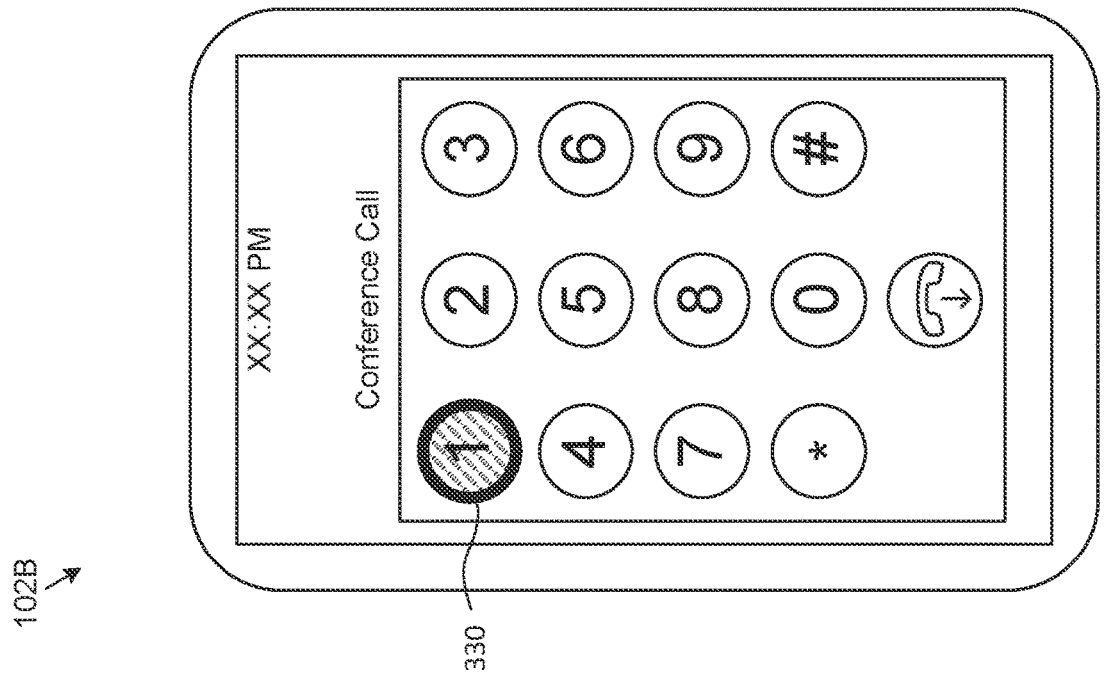
Figure 3C:
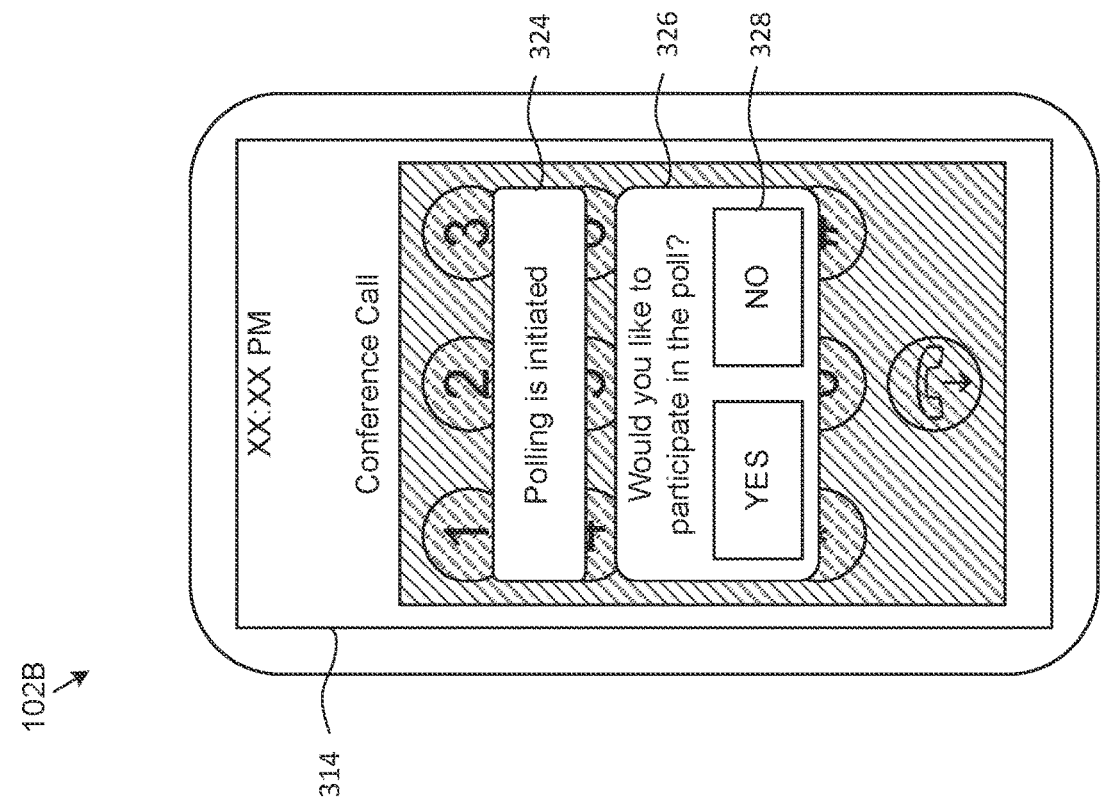

Conference management component 122 can determine whether to initiate audio-based polling at client device 102B. In some embodiments, conference management component 122 can transmit a message to client device 102B indicating that audio-based polling is initiated, in some embodiments. In some embodiments, client device 102B can provide the message to Participant B. For example, as illustrated in FIG. 3B, client device 102B can provide an audio-based alert 322 to Participant B (e.g., via an audio broadcast component of client device 102B) indicating that audio-polling is initiated. In another example, client device 102B can provide the message to Participant B via UI 314. As illustrated in FIG. 3C, client device 102B can modify UI 314 to include a UI element 324 that indicates that audio-based polling is initiated. In some embodiments, client device 102B can modify UI 314 to include another UI element 326 that includes a message inquiring whether Participant B would like to participate in the audio-based poll. UI element 326 can include one or more additional UI elements 328 (e.g., one or more buttons) that enable Participant B to provide an indication of whether he, she, or they would like to participate in audio-based polling. Client device 102B can detect that Participant B has engaged with a UI element 328 and can generate and transmit a message to conference management component 122 indicating whether Participant B would like to participate in audio-based polling, in view of the detection. It should be noted that although UI elements 324, 326, and/or 328 are depicted in FIG. 3C as different elements, in some embodiments, elements 324, 326 and/or 328 can be included in the same UI element. In some embodiments, client device 102B can provide the message to Participant B via a UI of another application running on client device 102B. For example, client device 102B can provide the message to Participant B via a text messaging application running on client device 102B. UI 314 of client device 102B can also provide a UI element (e.g., a text box) that enables Participant B to provide an indication of whether he, she, or they wants to participant in audio-based polling. Client device 102B can transmit a notification to conference management platform 122 indicating Participant B's response to the inquiry, in accordance with previously described embodiments.

In other or similar embodiments, conference management component 122 can determine whether to initiate audio-based polling at client device 102B in accordance with other techniques. For example, conference management component 122 can maintain a profile associated with client device 102B and store the profile at data store 110. The profile can include an indication of a setting of whether audio-based polling is to be initiated at client device 102B. Conference management component 122 can determine whether to initiate audio-based polling at client device 102B for the polling question 232 based on the indication of the setting. In another example, before or during the conference call, conference management component 122 can provide a message to each client device 102 associated with a participant of the conference call (e.g., including client device 102B) indicating that audio-based polling is activated during the call. Participant B can provide an indication of whether he, she, or they wants to participate in audio-based polling in response to receiving the message (e.g., by interacting with a UI element associated with the message, etc.). Conference management component 122 can receive a notification indicating whether Participant B wants to participate in audio-based polling and can store the indication at data store 110. In response to determining that a participant (e.g., Participant A) has provided a polling question, in accordance with previously described embodiments, conference management component 122 can determine whether to initiate audio-based polling at client device 102B for the polling question 232 based on the stored indication.

Conference management platform 122 may determine whether Participant B wants to participate in audio-based polling, in accordance with embodiments described above. Conference management platform 122 may not initiate audio-based polling at client device 102B in response to determining that Participant B does not want to participate in (i.e., has opted out of) audio-based polling. In response to determining that Participant B wants to participate in audio-based polling, conference management platform 122 can cause an audiovisual component at or coupled to client device 102B to record a verbal statement provided by Participant B, in accordance with previously described embodiments. In some embodiments, conference management platform 122 can prevent audio provided by Participant B from being provided to other participants of the conference call as the audiovisual component is recording the verbal statement provided by Participant B.

In some embodiments, conference management component 122 can cause the audiovisual component to stop recording the verbal statement after a predetermined amount of time after audio-based polling is initiated. In other or similar embodiments, conference management component 122 can cause the audiovisual component to stop recording the verbal statement after receiving an indication that Participant B has finished providing a verbal response to the polling question. For example, client device 102B can detect that Participant B has not provided a verbal statement within a particular period of time (e.g., Participant B has been silent). Client device 102B can transmit a notification to conference management component 122 indicating the detection and conference management component 122 can cause the audiovisual component to stop recording in response to receiving the notification. In another example, client device 102B can detect that Participant B has engaged with an element of UI 314 that is designated to stop recording by an audiovisual component at or coupled to client device 12-B. The element can be designated by conference management component 122 and can correspond to a numerical key 312 of numerical keypad 310. The designated element can correspond to designated key 330, as illustrated in FIG. 3D, in some example embodiments.

Client device 102B can generate audio data (e.g., an audio file) based on the recording by the audiovisual component and can transmit the audio data to conference management component 122, as described above. In other or similar embodiments, client device 102B can convert the audio data to one or more text strings including a textual form of the verbal statement provided by Participant B. Client device 102B can transmit the one or more text strings, with or without the audio data, to conference management component 122, in accordance with previously described embodiments.

Referring back to FIG. 2, conference management component 122 can receive the audio file and/or the one or more text strings associated with the verbal statement provided by Participant B. In some embodiments, text string identifier module 210 can convert the audio file to one or more text strings including a textual form of the verbal statement. In other or similar embodiments, text string identifier module 210 can identify the one or more text strings generated by client device 102B. Text string identifier module 210 can determine whether the verbal statement associated with the one or more text strings corresponds to an answer phrase. For example, text string identifier module 210 can parse each text string and determine whether a context of the text string corresponds with a context of an answer phrase. In another example, text string identifier module 210 can determine that the provided verbal answer corresponds to an answer phrase based on the received message from client device 102B (e.g., indicating that the verbal statement was provided in response to Participant B interacting with designated key 330).

In response to determining the provided verbal statement corresponds to an answer phrase, text string identifier module 210 can provide the one or more text strings including the verbal answer to polling answer component 224 of polling engine 151. Polling answer component 224 can store the provided verbal answer as a collected answer 234 at data store 110. As each answer 126 is received, answer collection component 222 can generate a mapping between the polling question 232 and the collected answer 234 and store the mapping at data store 110.

During the conference call, polling question component 222 can designate one or more verbal statements provided by participants of the conference call as polling questions 232 and answer collection component 222 can collect answers to the polling questions provided by participants of the conference call. During or after the conference call, polling results component 226 can generate results for each polling question stored at data store 110. For example, polling results component 226 can identify each polling question 232 at data store 110 and each collected answer 234 associated with each polling question 232 (e.g., based on a mapping between the polling question 232 and one or more collected answers 234). Polling results component 226 can analyze each collected answer for a polling question 232 and generate data associated with each polling question 232 based on the analysis. The generated data can be stored as polling results 236 at data store 110. In some embodiments, the generated data can include a number of participants that provided a particular answer to the polling question. In other or similar embodiments, polling results 238 can include data associated with participants that provided particular answers. For example, polling results component 226 can determine that a particular portion of participants that provided a particular answer to the polling question are associated with particular characteristics (e.g., identified via a profile associated with each participant). In another example, polling results component 226 can determine the number of video participants and/or audio participants that provided an answer 234 to the polling question 232. In response to the polling results component 226 generating polling results 236, conference management component 122 can provide polling results 236 to a client device 102 associated with one or more participants of the conference call during or after the conference call. For example, conference management component 122 can provide polling results 236 to client device associated with Participant A and/or an organizer of the conference call.

Figure 4:
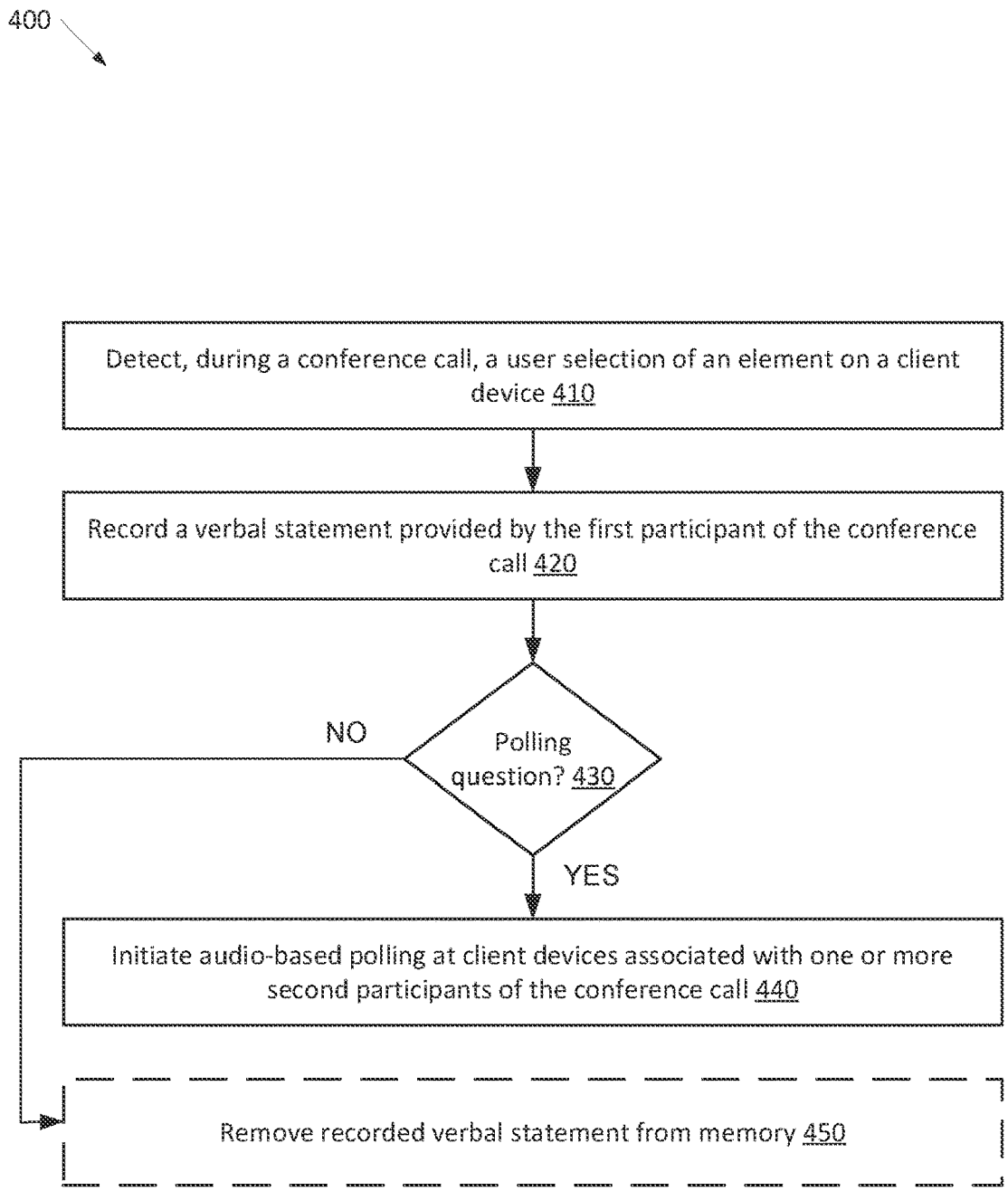
FIG. 4 depicts a flow diagram of a method for initiating audio-based polling via a client device, in accordance with implementations of the present disclosure.
Figure 5:
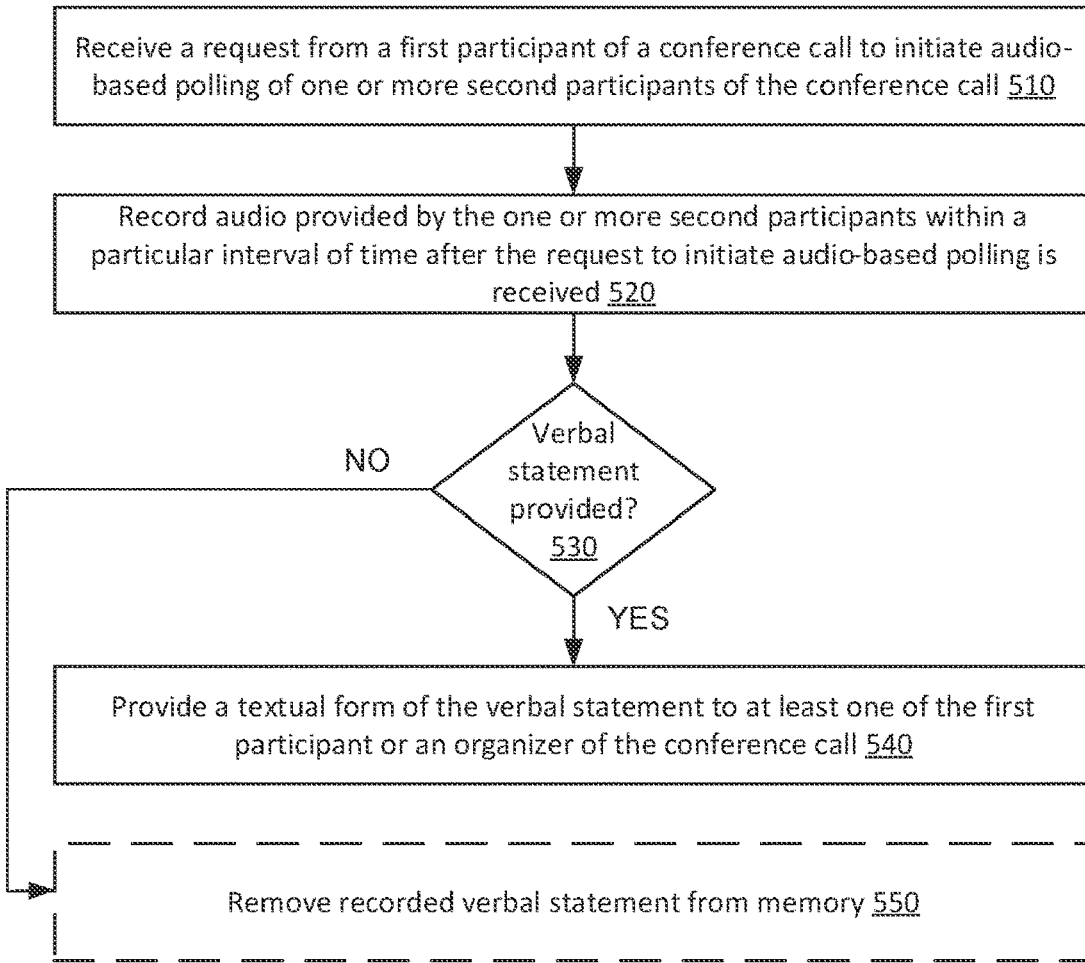
FIG. 5 depicts a flow diagram of a method for obtaining responses during audio-based polling via a client device, in accordance with implementations of the present disclosure.

FIG. 4 depicts a flow diagram of a method 400 for initiating audio-based polling via a client device, in accordance with implementations of the present disclosure. FIG. 5 depicts a flow diagram of a method 500 for obtaining responses during audio-based polling via a client device, in accordance with implementations of the present disclosure. Methods 400 and 500 may be performed by processing logic that may include hardware (circuitry, dedicated logic, etc.), software (e.g., instructions run on a processing device), or a combination thereof. In one implementation, some or all the operations of methods 400 and 500 may be performed by one or more components of system 100 of FIG. 1.

At block 410, processing logic can detect, during a conference call, a user selection of an element on a client device. In some embodiments, the element on the client device can be associated with multiple processes, the multiple processes including initiating audio-based polling of participants of the conference call. In some embodiments, the client device can include a telecommunication component. The element on the client device can correspond to a key of a keypad for the telecommunication component. At block 420, processing logic can record a verbal statement provided by a first participant of the conference call. In some embodiments, processing logic can record the verbal statement by causing an audiovisual component at or coupled to the client device to initiate a recording process, as described above.

At block 430, processing logic can determine whether the recorded verbal statement includes a question that is to be used for audio-based polling one or more second participants of the conference call. In some embodiments, processing logic can determine whether the recorded verbal statement includes question that is to be used for audio-based polling by identifying one or more text strings that include a textual form of the verbal statement provided by the participant. Processing logic can provide the one or more text strings as input to a trained machine learning model (e.g., model 222) and obtain one or more outputs from the trained machine learning model. Processing logic can extract, from the one or more outputs, a level of confidence that the verbal statement includes a question associated with audio-based polling during the conference call and determine whether the level of confidence satisfies a confidence criterion. In other or similar embodiments, processing logic can determine whether the recorded verbal statement includes question that is to be used for audio-based polling by detecting the user selection of an additional element on the client device. The additional element can be designated to indicate that a question included in the recorded verbal statement is to be used for audio-based polling.

Responsive to processing logic determining that the recorded verbal statement does not include a question that is to be used for audio-based polling, method 400 can end. Optionally, processing logic can remove the recorded verbal statement from memory (e.g., data store 110), as indicated by block 450. Responsive to processing logic determining that the recorded verbal statement does include a question that is to be used for audio-based polling, method 400 can proceed to block 440. At block 440, processing logic can initiate audio-based polling at client devices associated with one or more second participants of the conference call. In some embodiments, processing logic can initiate audio-based polling of the one or more second participants by performing one or more operations associated with method 500, described below.

As discussed above, FIG. 5 depicts a flow diagram of a method 500 for obtaining responses during audio-based polling via a client device, in accordance with implementations of the present disclosure. At block 510, processing logic receives a request from a first participant of a conference call to initiate audio-based polling of one or more second participants of the conference call. At block 520, processing logic records audio provided by the one or more second participants within a particular interval of time after the request to initiate audio-based polling is received. In some embodiments, processing logic can block transmission of audio via a client device associated with the one or more second participants during the particular interval of time. In some embodiments, processing logic can provide an alert to the one or more second participants that indicates that audio-based polling is initiated prior to recording the audio provided by the one or more second participants. Processing logic may not record audio provided by a participant in response to detecting that the participant has engaged with an element that is designated to prevent audio-based polling at the client device during the particular interval of time.

At block 530, processing logic determines whether the recorded audio includes one or more verbal statements provided by the one or more second participants within the particular interval of time. Responsive to processing logic determining that the recorded audio does not include one or more verbal statements provided by the one or more second participants within the particular interval of time, method 500 can end. Optionally, processing logic can remove the recorded verbal statement from memory (e.g., data store 110), as indicated by block 550. Responsive to processing logic determining that the recorded audio does include one or more verbal statements provided by the one or more second participants within the particular interval of time, method 500 can proceed to block 540.

At block 540, processing logic can provide a textual form of the verbal statement to at least one of the first participant or an organizer of the conference call. Processing logic can determine whether the one or more verbal statements provided by the one or more second participants corresponds to a verbal answer to a polling question. Processing logic can provide the textual form of the verbal statement to the first participant and/or the organizer of the conference call in response to determining that the verbal statements include a verbal answer to the polling question. In some embodiments, processing logic can provide the textual form of the verbal statement in a file or a report generated by processing logic during or after the conference call, in accordance with previously described embodiments.

Figure 6:
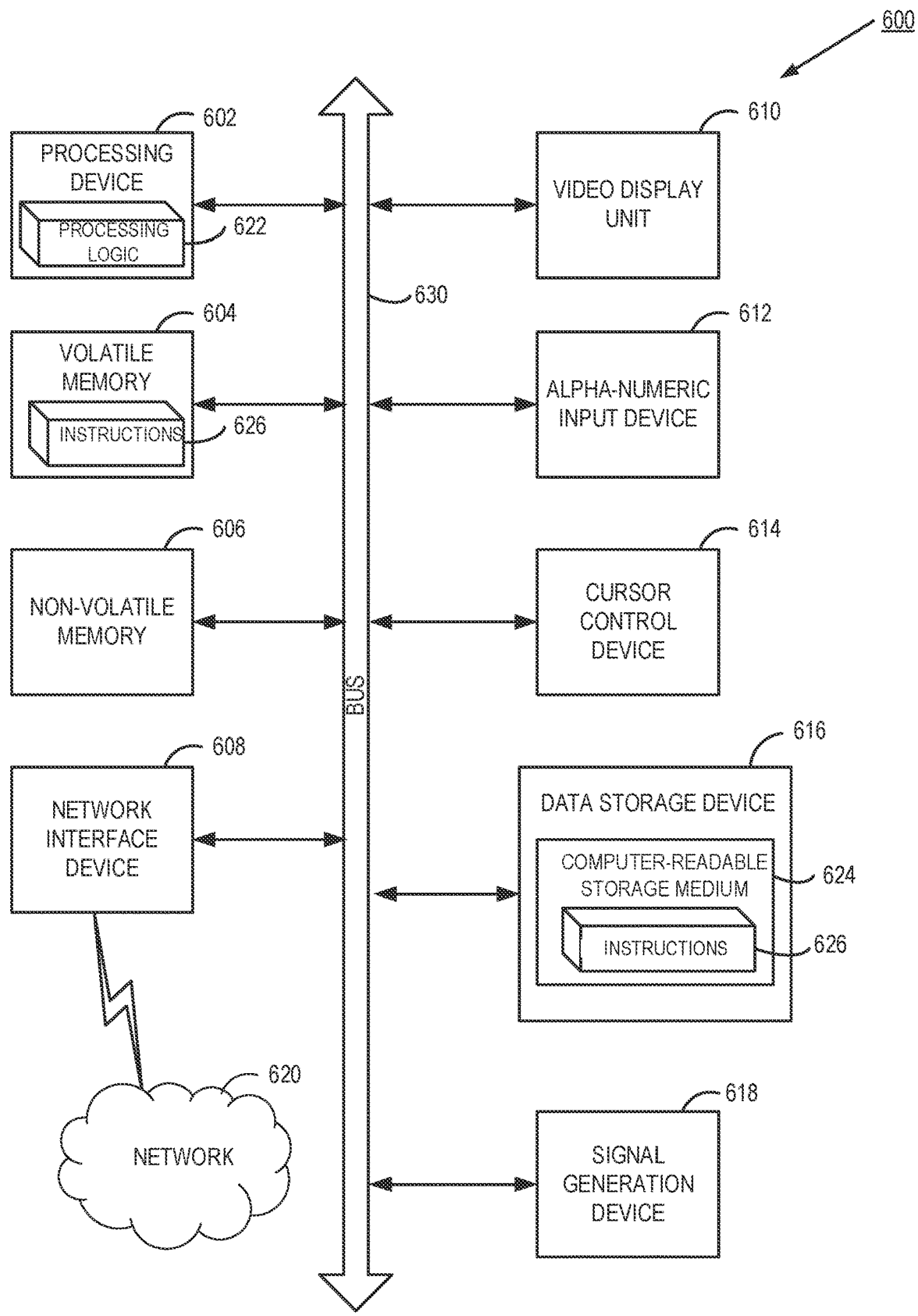
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the server machine 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for initiating audio-based polling during a conference call discussion) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for designating a verbal statement as a polling question. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
    detecting, during a conference call, a user selection of an element on a client device, wherein the element is designated to initiate audio-based polling of participants of the conference call;
    responsive to detecting the user selection of the element on the client device, recording a verbal statement provided by a first participant of the conference call;
    determining whether the recorded verbal statement comprises a question that is to be used for audio-based polling of one or more a plurality of second participants of the conference call; and
    responsive to determining that the verbal statement comprises the question that is to be used for audio-based polling of the plurality of second participants, initiating audio-based polling of the plurality of second participants.

2. The method of claim 1, wherein the element on the client device is associated with a plurality of processes, the plurality of processes comprising initiating polling of the participants of the conference call.

3. The method of claim 1, wherein the client device comprises a telecommunication component, and wherein the element on the client device corresponds to a key of a keypad for the telecommunication component.

4. The method of claim 1, wherein determining whether the recorded verbal statement comprises a question that is to be used for audio-based polling of the plurality of second participants of comprises:
    identifying one or more text strings comprising a textual form of the verbal statement provided by the first participant;
    providing the one or more text strings as input to a trained machine learning model;
    obtaining one or more outputs from the trained machine learning model;
    extracting, from the one or more outputs, a level of confidence that the verbal statement comprises a question associated with audio-based polling during the conference call; and
    determining whether the level of confidence satisfies a confidence criterion.

5. The method of claim 4, wherein identifying the one or more text strings comprising the textual form of the verbal statement comprises:
    converting an audio file comprising the recording of the verbal statement into a set of text strings comprising the one or more text strings.

6. The method of claim 1, wherein determining that the recorded verbal statement comprises a question that is to be used for audio-based polling of the plurality of second participants comprises:
    detecting the user selection of an additional element on the client device, wherein the additional element is designated to indicate that a question included in the recorded verbal statement is to be used for audio-based polling of the plurality of second participants.

7. The method of claim 1, further comprising:
    recording audio provided by at least one of the plurality of second participants within a particular interval of time after the audio-based polling of the plurality of second participants is initiated; and
    responsive to determining that the recorded audio comprises one or more verbal statements, providing a textual form of the verbal statements to at least one of the first participant or an organizer of the conference call.

8. A system comprising:
    a memory device; and
    a processing device coupled to the memory device, the processing device to perform operations comprising:
        receiving a request from a first participant of a plurality of participants of a conference call to initiate audio-based polling of one or more second participants of the plurality of participants;
        responsive to detecting a user selection of an element on a client device associated with at least one of the one or more second participants, recording audio provided by the at least one of the one or more second participants within a particular interval of time after the request to initiate audio-based polling is received;
        determining whether the recorded audio comprises one or more verbal statements provided by the at least one of the one or more second participants within the particular interval of time; and responsive to determining that the recorded audio comprises the one or more verbal statements, providing a textual form of the verbal statements to at least one of the first participant or an organizer of the conference call.

9. The system of claim 8, wherein the operations further comprise:

blocking a transmission of audio via a client device associated with the one or more second participants during the particular interval of time.

10. The system of claim 8, wherein the operations further comprise:

determining whether the one or more verbal statements provided by the one or more second participants within the particular interval of time correspond to a verbal answer to a polling question, wherein the textual form of the verbal statements is provided to at least one of the first participant or the organizer of the conference call responsive to determining that the verbal statements correspond to a verbal answer to the polling question.

11. The system of claim 8, wherein providing the textual form of the verbal statements to at least one of the first participant or the organizer of the conference call comprises:

generating a file comprising a result of the audio-based polling, wherein a portion of the file comprises one or more text strings comprising the textual form of a polling question that prompted the initiation of the audio-based polling, and an additional portion of the file comprises one or more text strings comprising the textual form of at least one verbal statement of the verbal statements provided by the one or more second participants.

12. The system of claim 8, wherein the operations further comprise:

prior to recording audio provided by the one or more second participants, providing an alert to the one or more second participants that indicates that audio-based polling is initiated.

13. The system of claim 12, wherein the element is further designated to prevent audio-based polling at the client device during at least the particular interval of time.

14. A non-transitory computer readable storage medium comprising instructions for a server that, when executed by a processing device, cause the processing device to perform operations comprising:

detecting, during a conference call, a user selection of an element on a client device, wherein the element is designated to initiate audio-based polling of participants of the conference call;

responsive to detecting the user selection of the element on the client device, recording a verbal statement provided by a first participant of the conference call;

determining whether the recorded verbal statement comprises a question that is to be used for audio-based polling of a plurality of second participants of the conference call; and responsive to determining that the verbal statement comprises the question that is to be used for audio-based polling of the plurality of second participants, initiating audio-based polling of the plurality of second participants.

15. The non-transitory computer readable storage medium of claim 14, wherein the element on the client device is associated with a plurality of processes, the plurality of processes comprising initiating polling of the participants of the conference call.

16. The non-transitory computer readable storage medium of claim 14, wherein the client device comprises a telecommunication component, and wherein the element on the client device corresponds to a key of a keypad for the telecommunication component.

17. The non-transitory computer readable storage medium of claim 14, wherein determining whether the recorded verbal statement comprises a question that is to be used for audio-based polling of the plurality of second participants comprises:

identifying one or more text strings comprising a textual form of the verbal statement provided by the first participant;

providing the one or more text strings as input to a trained machine learning model;

obtaining one or more outputs from the trained machine learning model;

extracting, from the one or more outputs, a level of confidence that the verbal statement comprises a question associated with audio-based polling during the conference call; and determining whether the level of confidence satisfies a confidence criterion.

18. The non-transitory computer readable storage medium of claim 17, wherein identifying the one or more text strings comprising the textual form of the verbal statement comprises:

converting an audio file comprising the recording of the verbal statement into a set of text strings comprising the one or more text strings.

19. The non-transitory computer readable storage medium of claim 14, wherein determining that the recorded verbal statement comprises a question that is to be used for audio-based polling of the plurality of second participants comprises:

detecting the user selection of an additional element on the client device, wherein the additional element is designated to indicate that a question included in the recorded verbal statement is to be used for audio-based polling of the plurality of one or more second participants.

20. The non-transitory computer readable storage medium of claim 14, further comprising:

recording audio provided by at least one of the plurality of second participants within a particular interval of time after the audio-based polling of the plurality of second participants is initiated; and responsive to determining that the recorded audio comprises one or more verbal statements, providing a textual form of the verbal statements to at least one of the first participant or an organizer of the conference call.

* * * * *